(12) United States Patent
Aljadeff et al.

(10) Patent No.: US 7,522,049 B2
(45) Date of Patent: Apr. 21, 2009

(54) WIRELESS LOCAL AREA NETWORK (WLAN) METHOD AND SYSTEM FOR PRESENCE DETECTION AND LOCATION FINDING

(75) Inventors: Daniel Aljadeff, Kiriat Ono (IL); Reuven Amsalem, Nes-ziona (IL)

(73) Assignee: AeroScout, Ltd., Rehovot (IL)

( * ) Notice: Subject to any disclaimer, the term of this patent is extended or adjusted under 35 U.S.C. 154(b) by 347 days.

(21) Appl. No.: 11/124,998

(22) Filed: May 9, 2005

(65) Prior Publication Data
US 2005/0207381 A1    Sep. 22, 2005

Related U.S. Application Data

(63) Continuation-in-part of application No. 11/059,047, filed on Feb. 16, 2005, which is a continuation-in-part of application No. 10/274,698, filed on Oct. 18, 2002, now Pat. No. 6,963,289.

(60) Provisional application No. 60/569,693, filed on May 10, 2004.

(51) Int. Cl.
*G08B 13/14* (2006.01)
(52) U.S. Cl. .............................. 340/572.1; 340/825.49
(58) Field of Classification Search .............. 340/572.1, 340/825.49, 573.1, 10.1, 10.3; 342/357.07, 342/357.09
See application file for complete search history.

(56) References Cited

U.S. PATENT DOCUMENTS

| | | | |
|---|---|---|---|
| 5,119,104 A * | 6/1992 | Heller | 342/450 |
| 6,353,406 B1 * | 3/2002 | Lanzl et al. | 340/573.1 |
| 6,424,264 B1 * | 7/2002 | Giraldin et al. | 340/573.1 |
| 6,525,648 B1 * | 2/2003 | Kubler et al. | 340/10.33 |
| 6,556,832 B1 | 4/2003 | Soliman | |
| 6,614,350 B1 * | 9/2003 | Lunsford et al. | 340/572.1 |
| 6,700,533 B1 * | 3/2004 | Werb et al. | 342/357.07 |
| 6,963,289 B2 * | 11/2005 | Aljadeff et al. | 340/10.33 |
| 7,002,943 B2 * | 2/2006 | Bhagwat et al. | 370/338 |
| 2002/0086640 A1 | 7/2002 | Belcher et al. | |
| 2002/0098852 A1 | 7/2002 | Goren et al. | |

* cited by examiner

*Primary Examiner*—John A Tweel, Jr.
(74) *Attorney, Agent, or Firm*—Jeffrey D. Moy; Weiss & Moy, P.C.

(57) ABSTRACT

A wireless local area network (WLAN) method and system for presence detection provide a low-cost and WLAN-compatible means for detecting the presence of an asset without requiring full location-finding support within a WLAN environment. The presence of a transmitter is detected by examining the signal strength of a presence signal. The presence signal is WLAN-compatible, but does not require association of the transmitter with the WLAN and does not require a response from the WLAN. The presence signal may be transmitted on multiple WLAN channels for presence detection by multiple WLAN APs. The presence signals transmissions may be periodic or may be stimulated by a stimulus from the WLAN or external device that may or may not be coupled to the WLAN. Location finding can also be performed in combination with the signal strength presence detection.

20 Claims, 3 Drawing Sheets

WIRELESS LOCAL AREA NETWORK (WLAN) METHOD AND SYSTEM FOR PRESENCE DETECTION AND LOCATION FINDING

CROSS-REFERENCE TO RELATED APPLICATIONS

This application is related to U.S. provisional application Ser. No. 60/569,693 filed May 10, 2004 and from which it claims benefits under 35 U.S.C. §119(e).

The present application is also a Continuation-in-Part of U.S. patent application "RADIO-FREQUENCY IDENTIFICATION (RFID) TAG EMPLOYING UNIQUE RECEPTION WINDOW AND METHOD THEREFOR", Ser. No. 11/059,047, filed Feb. 16, 2005, which is a Continuation-in-Part of U.S. patent application Ser. No. 10/274,698 filed on Oct. 18, 2002 now U.S. Pat. No. 6,963,289 published as US20040078151A1. The specifications of the above-referenced U.S. Patent Applications are herein incorporated by reference.

BACKGROUND OF THE INVENTION

1. Field of the Invention

The present invention relates generally to detection of presence of assets in an area, and more specifically, to an asset presence detection and location finding system for implementation in wireless local area network environments.

2. Background of the Invention

Wireless asset detection and tracking systems are increasing in prevalence as wireless systems are incorporated in buildings and other areas such as Internet kiosks and lounges. Additionally, radio-frequency identification (RFID) tags have been in use for many years for tracking assets, such as in shipping yards and facilities and in consumer outlets for inventory and theft management.

The above-incorporated parent application discloses an RFID tag system using a Wireless Local Area Network (WLAN) channel that takes advantage of existing WLAN infrastructure to locate RFID tags. However, in some applications it is not necessary or cost-effective to provide enough access points (APs) or location units, determine times-of-arrival and perform triangulation to fully locate a tag or other transmitting device in a WLAN environment, when all that is necessary is that the presence of an asset be detected.

Presence detectors have also been in use for many years in many applications, but not generally in wireless networks for the purpose of detecting the presence of assets. Generally, the detection of the presence of a WLAN unit results in the connection of the WLAN unit to the AP after which presence can be confirmed or no connection may result, after which the presence of a "rogue" device may be confirmed. However, in either case, the goal is generally to connect the WLAN unit to the wireless network via the AP. Further, WLAN APs and other units typically provide no means for detecting any device (WLAN-compatible or not) that is not attempting connection on a particular AP's channel, or at least attempting to locate a device for connection to an AP via a probe request message (in 802.11 revision systems).

It would also be useful to incorporate location-finding in a WLAN either in combination with presence detection or separately, without requiring that the device being located associate with the network or attempt association with the network.

Therefore, it would be desirable to provide a presence detection system for detecting WLAN compatible transmitters using units of a wireless network, without requiring a separate asset tracking system, and without disrupting operation of the WLAN.

SUMMARY OF THE INVENTION

The above objective of detecting the presence of assets within a WLAN environment without requiring a separate asset tracking system is provided in an asset transmitter, a WLAN system and method.

The asset transmitter may be a tag or other unit such as a WLAN node that transmits a "presence" signal. The presence signal is a standard format signal that is compatible with revisions of the IEEE 802.11 specification as implemented by the WLAN, and does not disrupt communications of the WLAN. The presence signal is a broadcast/multicast signal that does not require a response from any WLAN node, nor that the transmitter be associated with another WLAN unit such as an access point. The presence signal may be periodically transmitted without the transmission being linked to network events or status such as association, de-association, re-association, and so forth.

A sniffer circuit is employed in the asset transmitter to detect a silence interval in WLAN transmissions and the presence signal is only transmitted during a detected silence. The parameters of the presence signal transmissions may be controlled via WLAN commands, or the presence signal transmission may be stimulated by an external stimulus. The external stimulus may be a low-frequency magnetic field stimulus, infrared stimulus, or a detection of certain WLAN signals as performed in the above-incorporated parent application.

The presence signal is received by one or more WLAN nodes such as access points that include signal strength detectors. Presence of the asset transmitter in the vicinity of the one or more WLAN nodes is evaluated by the absolute and/or relative signal strength at each of the one or more WLAN nodes.

The foregoing and other objectives, features, and advantages of the invention will be apparent from the following, more particular, description of the preferred embodiment of the invention, as illustrated in the accompanying drawings.

DETAILED DESCRIPTION OF THE ILLUSTRATIVE EMBODIMENT

The present invention includes improvements to presence detection and location-finding in a wireless local area network (WLAN) by generating and transmitting a "presence" signal that is WLAN-compatible, but not following the standard protocol of the WLAN as defined in the various revisions of the IEEE 802.11 specification presently in use (e.g., 802.11a, 802.11b and 802.11g). The presence signal is a multicast/broadcast signal (i.e., a signal targeting all devices or a group of devices) and is sent only when WLAN traffic is determined to be absent via a sniffer circuit. However, the presence signal may be a signal resembling existing WLAN signals, such as a data transmission that has a multicast or broadcast address and therefore generates no response from another WLAN node.

The presence signal includes a node identifier, which may be a media access control (MAC) address of the node, or another identifier that provides the WLAN system with the ability to uniquely identify a node transmitting the presence signal. The presence signal is transmitted on one or more WLAN channels and has a preamble and code sequence compatible with the WLAN, but is unique in that it is a signal for which no response is expected under the specification controlling operation of the WLAN. By engendering no response (i.e., no acknowledgement or other control signal is sent by another unit in response to the presence signal) a minimum of bandwidth is used for either presence detection or location-finding and by maintaining WLAN signal compatibility, no disruption of the WLAN operation is caused by the transmission of the presence signal.

The present invention applies to any WLAN device, including radio-frequency identification (RFID) tags that transmit WLAN compatible signals (including tags that transmit only the presence signal of the present invention), as well as other networked devices such as peripherals and computers having WLAN interfaces.

Figure 1:
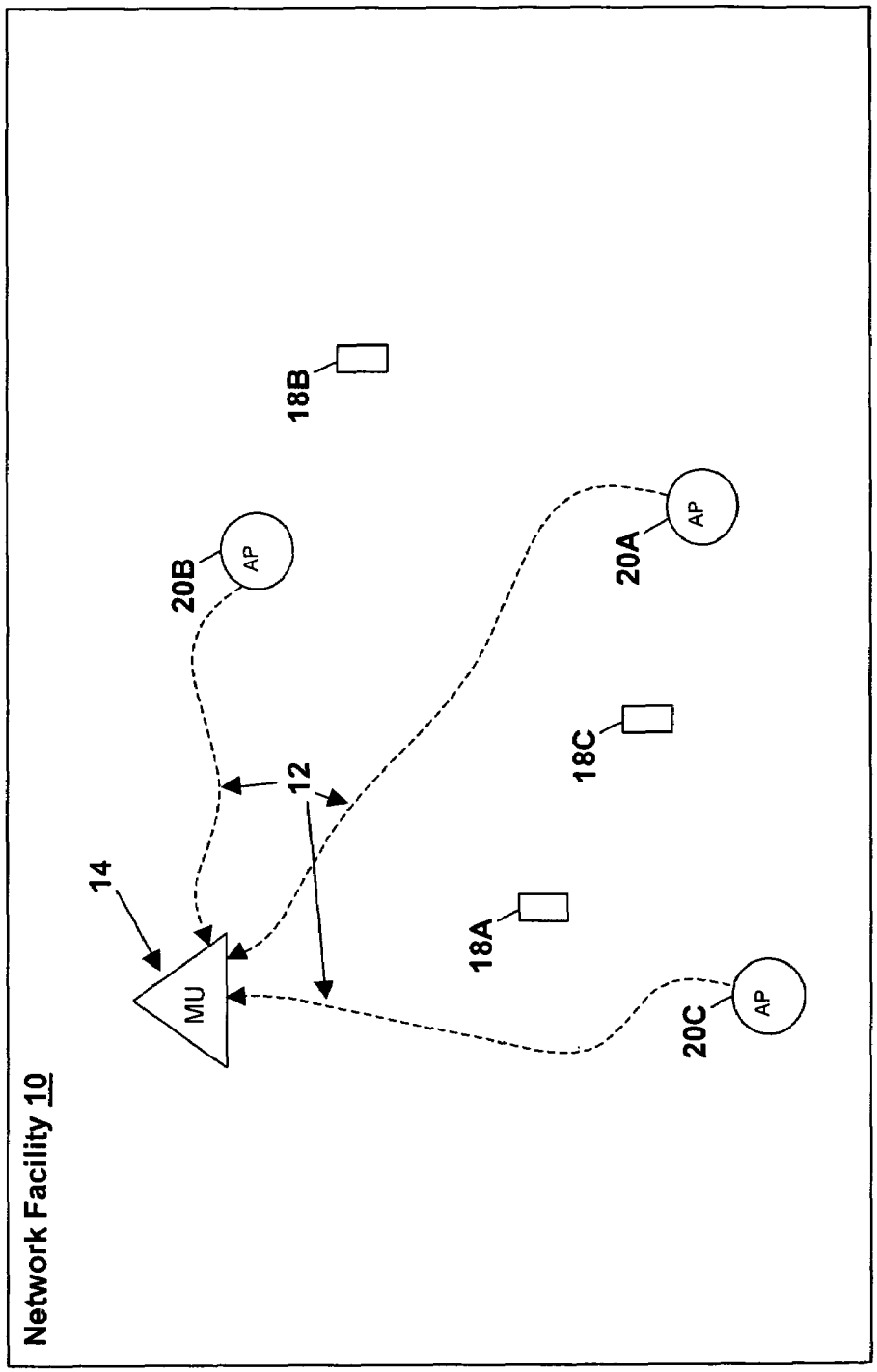
FIG. 1 is a block diagram depicting a wireless network including presence detection in accordance with an embodiment of the present invention.

Referring now to the figures, and in particular to FIG. 1, a WLAN system in accordance with an embodiment of the present invention is shown. Asset transmitters 18A-C are located within range of one or more access points 20A-C that are used to detect the presence and/or location of asset transmitters 18A-C and communicate signal measurement information to a master unit 14 via a wired 12 or wireless connection (using WLAN communications). Master unit 14 evaluates the signal measurement information to determine presence and/or location information regarding asset transmitters 18A-C.

While the depicted system uses access points 20A-C to detect the presence signal transmitted by transmitters 18A-C and a master unit 14 to evaluate signal measurement information to determine presence and/or location, master unit 14 need not be a separate unit and may be a WLAN unit such as one of access points 20A-C. Also, it should be understood that as long as asset transmitters 18A-C transmit the presence signal of the present invention, asset transmitters 18A-C may be RFID tags (including transmit-only tags and tags that have WLAN receive capability such as those described in the above-incorporated U.S. patent application) or other WLAN units such as notebook computer WLAN interfaces or peripheral interfaces.

Presence detection and location finding are performed by received signal-strength indication (RSSI) measurements. RSSI techniques can use either absolute or relative signal-strength values to determine presence, or interpolation of multiple signal-strength values to determine location. In the present invention, the above-described measurements are performed on the presence signal transmitted by asset transmitters 18A-C. The system of the present invention reports the presence/location (or lack thereof) of asset transmitters 18A-C to administrative software and/or other applications that use the presence and/or location information generated by the system of the present invention.

As mentioned above, the presence signal is a standard format WLAN-compatible multicast/broadcast signal that contains a MAC address or other unique identifier that identifies a particular unit that is transmitting the presence signal. It is not possible to respond to the presence signal, as the presence signal protocol used by units in accordance with embodiments of the present invention do not respond to the present signal with an acknowledgement or any other WLAN signal. A signal in the WLAN standards mentioned above that does not require either an acknowledgement (ACK) response or a control signal sent in response to a transmission (e.g., RTS/CTS handshaking) is the access point beacon signal, which can only be transmitted by APs for which a location is already known and presence is a given. Therefore, the presence signal of the present invention adds a unique capability to a mobile WLAN node or any non-AP node in that using the presence signal of the present invention, the non-AP node can transmit a signal by which location or presence can be established without causing a response from the WLAN and without requiring any association or previous handshaking with the WLAN.

By way of illustration, if presence detection or location-finding are performed using the detected signal strength of a Probe Request signal, the APs must still respond with a Probe Response. If presence detection or location-finding are performed using a CTS signal, as described in the above-incorporated U.S. patent applications, the AP must first send an RTS to the asset transmitter, meaning that the asset transmitter's address must be known. If RTS were used, then the WLAN must respond with a CTS signal and reserve at least the minimum amount of response time, and so forth. If any other WLAN signal were used for presence detection or location-finding, then the asset transmitter would have to be in association with the WLAN already in order to maintain WLAN protocol.

Further, WLAN protocols for associated nodes require that the nodes communicate only on the WLAN channel of the AP to which the nodes are connected. Addition of the presence signal makes it possible for an asset transmitter that is already associated with an AP to send signals that can be received by other APs without interfering with the network, as other than location-finding and/or presence detection measurements, no other action will be taken by the receiving nodes.

Figure 2:
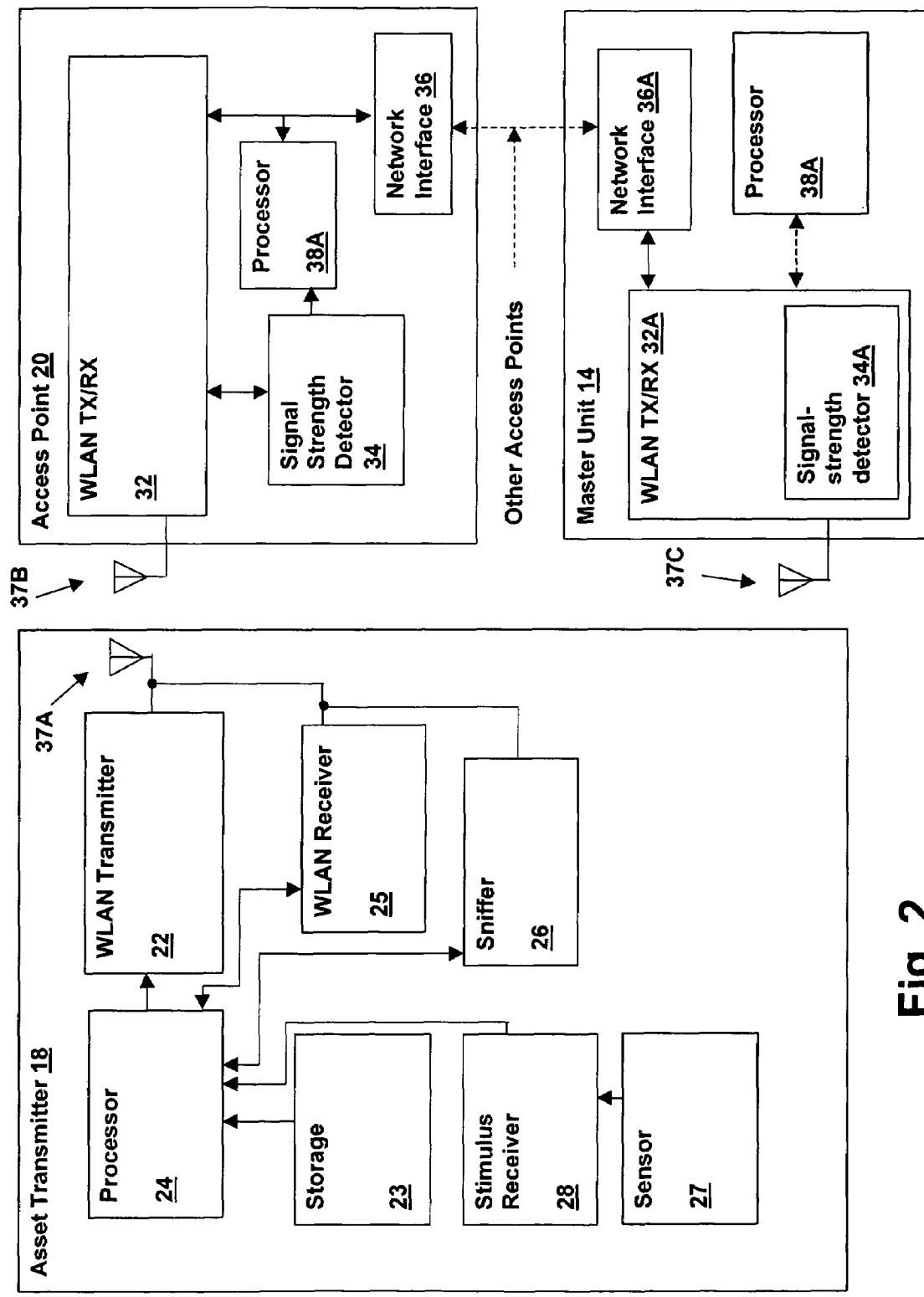
FIG. 2 is a block diagram depicting wireless network units in the wireless network of FIG. 1.

With reference now to FIG. 2, details of components of the WLAN of FIG. 1 are depicted in a block diagram. Asset transmitter 18 includes a WLAN transmitter 22 that transmits signals originated by a processor 24, including the above-described presence signals on one or more channels of the WLAN, via an antenna 37A. The presence signal may be transmitted periodically at predetermined intervals and includes the MAC address or other identifier of asset transmitter 18 that is retrieved from storage 23, which may also store processor 24 instructions and data. Asset transmitter 18 optionally includes a WLAN receiver 25 for receiving signals from the WLAN system, which may be simple commands to control transmission of the presence signal and other parameters if asset transmitter 18 is an RFID tag, or may support full WLAN operation if asset transmitter 18 is a WLAN node.

Receiver 25 is coupled to processor 24 for providing received data and command information to processor 24 and for receiving control information from processor 24. Processor 24 may control a power state of receiver 26, so that receiver 26 is only powered-up when desirable. As an alternative to periodic transmission of presence signals, a stimulus receiver 28 may detect the presence of an external stimulus via a sensor 27. Sensor may for example be a low-frequency magnetic field detector of a type generally used to activate standard non-WLAN RFID tags or passive re-radiating tags when brought proximate an external exciter. Adding this capability to asset transmitter 18 affords the WLAN the added capability of using existing technology such as door exit portal transmitters to activate asset transmitters and commence presence detection or location finding of assets. Sensor 27 may also be an infrared sensor that provides added security for presence detection and/or location-finding by activating transmission of the presence signal only in response to a local infrared communication from another device in the WLAN. A zone identification can be made or confirmed by sending an identifier received from the stimulus source along with the asset transmitters MAC address or ID in the presence signal transmission. For example, a tag may transmit a presence signal including the tag ID along with the ID of the low-frequency RFID of the exciter that activated the tag.

A sniffer circuit 26 as described in the above-incorporated U.S. Patent Applications is also be incorporated to either provide the functionality described therein, such that presence signal transmissions are only made when no WLAN signals are being transmitted, thus reducing the chance of collisions and providing timing for powering up WLAN receiver 25 to receive command and control information in battery operated applications such as tags, or sniffer may be used also to activate presence transmissions only when a WLAN system is detected via detecting that WLAN traffic is occurring over a longer time interval. (Sniffer 26 first detects that asset transmitter is in the presence of a WLAN, and then determines when the WLAN is momentarily silent before transmitting the presence signal.)

Another optional extension to asset transmitter 18 is to scan through potential WLAN channels and locating the channel of a nearby AP. The presence signal is then transmitted on that channel.

Access point 20 receives WLAN signals via antenna 37B and includes a WLAN receiver/transmitter 32 that detects WLAN signals and passes the detected and decoded signal information to a processor 38A. Access point 30 includes a signal strength detector 34 for presence detection or location-finding based on signal strength measurements. When the presence signal is detected by WLAN transmitter/receiver 32 signal strength information is communicated to master unit 14 via network interface 36 or alternatively via WLAN receiver/transmitter 32 using standard WLAN data transmissions.

Master unit 14 includes a WLAN transmitter/receiver 32A and a processor 38A similar in operation to that of AP 20 and may also include and signal strength detector 34A if master unit 14 participates in the signal measurement portion of the presence detection/location-finding system. Master unit 14 also may include a network interface 36A for receiving the signal-strength from other units (APs 20A-C of FIG. 1). Processor 38A computes presence information and/or the location of an asset transmitter from the received signal-strength information by comparing signal strength ratios between the receiving APs.

Figure 3:
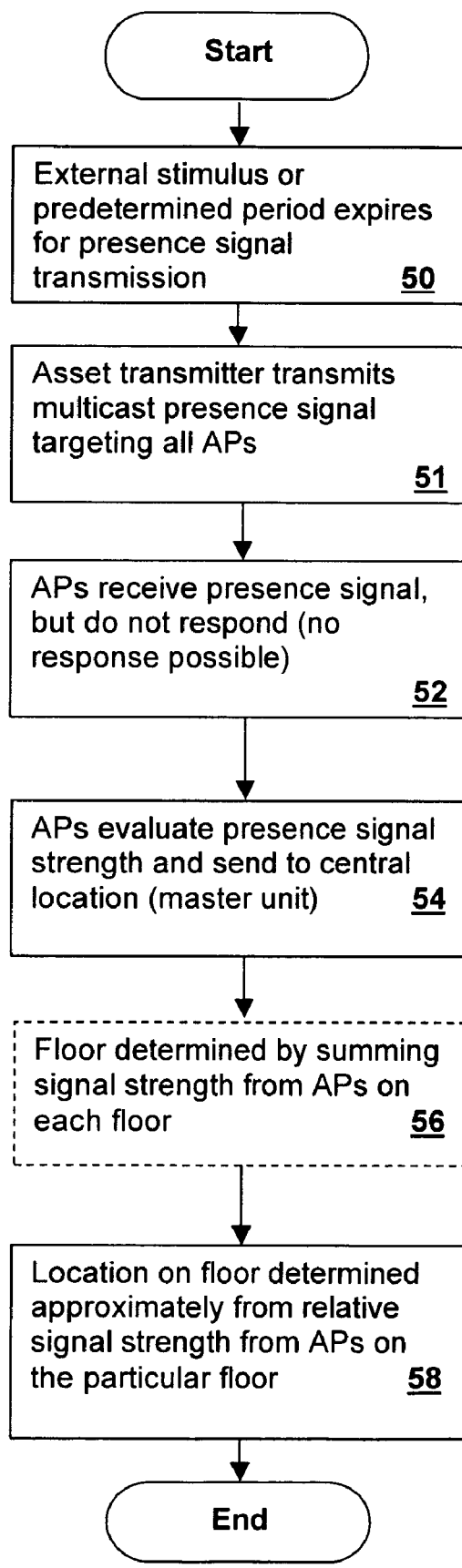
FIG. 3 is a flowchart illustrating a method in accordance with an embodiment of the present invention.

Referring now to FIG. 3, a method in accordance with an embodiment of the present invention is depicted. First an external stimulus is detected or a predetermined period of time expires that controls the transmission of the presence signal (step 50). The asset transmitter transmits the presence signal (step 51), which is received by one or more APs that do not respond to the presence signal because no response is possible (step 52). The APs determine the signal strength of the received presence signal (step 54) and the master unit evaluates the measured signal information (steps 56 and 58). An exemplary and optional technique for floor discrimination is depicted in which first the signal strengths for each floor for the presence signal are summed and then the sums are compared to determine the maximum, which indicates the floor on which the asset transmitter is located (step 56). Then, the location of the asset transmitter on the particular floor can be determined by interpolation of the signal-strength ratios (step 58).

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A presence detection system incorporated within a wireless local area network (WLAN), comprising:
one or more WLAN access points each including a received signal strength measurement circuit and operating according to a revision of the IEEE 802.11 specification;
an asset transmitter for transmitting a broadcast/multicast presence signal, wherein said presence signal is transmitted on one or more channels of said WLAN, to which no receiving unit in the WLAN can make a response and for which no association with another unit of said WLAN is required, and wherein said asset transmitter comprises a sniffer circuit for detecting other WLAN transmissions and wherein said asset transmitter transmits said presence signal only when said sniffer circuit detects that said other transmissions are absent; and
an evaluator coupled to said one or more WLAN nodes for receiving signal strength values from each received signal strength measurement circuit within said one or more WLAN nodes and determining whether or not said asset transmitter is present in the vicinity of said one or more WLAN nodes in conformity with said signal strength values, whereby said presence signals can be detected by said access points without association of said asset transmitter with said WLAN while maintaining normal operation with other associated units of said WLAN.

2. The presence detection system of claim 1, wherein said asset transmitter transmits said presence signal on multiple channels of said WLAN, and wherein said one or more WLAN nodes include nodes configured to receive on distinct ones of said multiple channels.

3. The presence detection system of claim 1, wherein said asset transmitter transmits said presence signal while not associated with any of said WLAN access points.

4. The presence detection system of claim 1, wherein said asset transmitter is associated with a given one of said access points, and said presence signal is transmitted on at least one other channel differing from a channel of said given access point, whereby said presence signal is received by one of said one or more WLAN nodes configured to receive on said at least one other channel.

5. The presence detection system of claim 1, wherein said asset transmitter further comprises a stimulus receiver for receiving a stimulus other than a WLAN transmission and wherein said asset transmitter transmits said presence signal in response to said stimulus receiver receiving said stimulus.

6. The presence detection system of claim 5, wherein said stimulus is a low-frequency tag exciter signal and said stimulus receiver is a magnetic field detector.

7. The presence detection system of claim 1, wherein said asset transmitter is associated with an access point, and wherein said access point transmits a WLAN command for controlling transmission parameters of said presence signal including at least one of an enable/disable state of said presence signal, a rate of transmission of said presence signal and a power level of transmission of said presence signal.

8. The presence detection system of claim 1, wherein said asset transmitter includes a receiver that scans multiple channels of said WLAN to select a channel for transmitting said presence signal by detecting an available one of said one or more access points.

9. The presence detection system of claim 1, wherein said sniffer circuit further detects when said asset transmitter is in the presence of a WLAN, and wherein said presence signal is transmitted only after said presence of said WLAN has been detected.

10. A method of operating a wireless local area network (WLAN), comprising:
   detecting via a sniffer circuit of an asset transmitter, whether or not a WLAN transmission is occurring;
   in response to detecting that said WLAN transmission is not occurring, transmitting a broadcast/multicast presence signal from said asset transmitter, wherein said presence signal is transmitted on one or more channels of said WLAN, to which no receiving unit in the WLAN can make a response and for which no association with another unit of said WLAN is required;
   receiving said presence signal at one or more access points of said WLAN, said access points operating according to a revision of the IEEE 802.11 specification;
   determining a received signal strength of said presence signal at each of said one or more access point; and
   evaluating whether said asset transmitter is present in the vicinity of said one or more access points in conformity with said received signal strength, whereby said presence signals can be detected by said access points without association of said asset transmitter with said WLAN while maintaining normal operation with other associated units of said WLAN.

11. The method of claim 10, wherein said transmitting transmits said presence signal on multiple channels of said WLAN, and wherein said receiving receives said presence signal at multiple access points of said WLAN, each configured to receive said presence signal on a corresponding one of said multiple channels.

12. The method of claim 10, further comprising associating said asset transmitter with a given one of said access points, and wherein said transmitting transmits said presence signal on at least one other channel differing from a channel of said given access point, whereby said presence signal is received by another one of said access points nodes configured to receive on said at least one other channel.

13. The method of claim 10, further comprising receiving a stimulus other than a WLAN transmission at said asset transmitter, and wherein said transmitting transmits said presence signal in response to said receiving said stimulus.

14. The method of claim 13, wherein said stimulus is a low-frequency tag exciter signal.

15. The method of claim 10, further comprising associating said asset transmitter with a given one of said access points, and wherein said given access point transmits a WLAN command for controlling transmission parameters of said presence signal including at least one of an enable/disable state of said presence signal, a rate of transmission of said presence signal and a power level of transmission of said presence signal.

16. The method of claim 10, further comprising scanning multiple channels of said WLAN to select a channel for transmitting said presence signal by detecting an available one of said one or more access points.

17. The method of claim 10, further comprising detecting via said sniffer circuit when said asset transmitter is in the presence of a WLAN, and wherein said transmitting is performed only after said presence of said WLAN has been detected.

18. The method of claim 10, wherein said transmitting is performed without associating said asset transmitter with any WLAN access point.

19. A node for interacting with a wireless local area network (WLAN), comprising:
   a transmitter for transmitting a broadcast/multicast presence signal, wherein said presence signal is transmitted on one or more channels of said WLAN, to which no receiving unit in the WLAN can make a response and for which no association with another unit of said WLAN is required;
   a sniffer for detecting whether or not WLAN signals are present in said WLAN; and
   a control circuit having an input coupled to an output of said sniffer and an output coupled to said transmitter for causing said transmitter to transmit said presence signal only when said sniffer detects that WLAN signals are not present.

20. The WLAN node of claim 19, further comprising a stimulus receiver for receiving an external stimulus other than a WLAN transmission, and wherein said transmitter transmits said signal in further response to an output of said stimulus receiver.

* * * * *